United States Patent [19]
Omata

[11] Patent Number: 4,550,470
[45] Date of Patent: Nov. 5, 1985

[54] COMBINED ROTARY DAMPER DEVICE INCLUDING A STORED ENERGY MECHANISM AND BRAKING MECHANISM

[75] Inventor: Nobuaki Omata, Yokohama, Japan
[73] Assignee: Nifco Inc., Yokohama, Japan
[21] Appl. No.: 614,604
[22] Filed: May 29, 1984
[30] Foreign Application Priority Data
  Jun. 1, 1983 [JP] Japan .................. 58-95819
[51] Int. Cl.⁴ .................................................. E05F 5/02
[52] U.S. Cl. ............................... 16/85; 16/DIG. 9; 188/290; 267/8 R; 267/114
[58] Field of Search .............. 16/51, 54, 55, 62, 82, 16/84, 85, 298, 299, 300, 301, 304, 306, DIG. 9, DIG. 10; 49/379, 386; 188/306, 290; 267/8 R, 114

[56] References Cited
U.S. PATENT DOCUMENTS

| | | | |
|---|---|---|---|
| 1,172,267 | 2/1916 | Eisner | 16/299 |
| 3,160,911 | 12/1964 | Morris et al. | 16/82 X |
| 3,467,982 | 9/1969 | Pracht | 16/55 |
| 3,825,973 | 7/1974 | Gwozdz | 16/300 |
| 3,952,365 | 8/1976 | Grisebach | 16/82 X |
| 4,426,752 | 1/1984 | Nakayama | 16/DIG. 9 X |

FOREIGN PATENT DOCUMENTS
502163 7/1930 Fed. Rep. of Germany .......... 16/51

Primary Examiner—Fred Silverberg
Attorney, Agent, or Firm—J. R. Halvorsen; T. W. Buckman

[57] ABSTRACT

A rotary damper device comprises a base plate, a rotary cylinder rotatably disposed on the base plate through the medium of a damper, and a coil spring interconnecting the base plate and the rotary cylinder. The base plate and the rotary cylinder are interconnected to the main body of a device and the lid of the device. When the lid is opened or closed, the braking force of the damper and the resilient force of the coil spring cooperate to generate effective braking force and enable the opening-closing device to be opened or closed smoothly under the influence of the effective braking force.

4 Claims, 7 Drawing Figures

4,550,470

COMBINED ROTARY DAMPER DEVICE INCLUDING A STORED ENERGY MECHANISM AND BRAKING MECHANISM

BACKGROUND OF THE INVENTION

This invention relates to a rotary damper means for braking both opening and closing motions of various closing devices such as cassette lids and doors, and more particularly to a rotary damper means for braking and absorbing such opening and closing motions of lids and doors by the combined action of a coil spring and viscous oil.

Various rotary dampers are used, for example, for the purpose of braking sudden spring-action opening motions of cassette lids in cassette tape recorders and video cassette recorders. The rotary dampers of this type include frictional rotary dampers adapted to brake the opening and closing motions by the frictional contact of a built-in rotary member and oil type rotary dampers which provide their braking function by keeping a similar rotary member in a bath of highly viscous oil such as silicone oil (U.S. Pat. No. 4,342,135).

All such conventional dampers comprise numerous component parts, require much time and labor for assembly, occupy large spaces, and are high in cost.

In Japanese Patent Application No. SHO 54(1983)-55429 (filed on Apr. 15, 1983), therefore, the inventor proposed a rotary damper means using a spring such as a coil spring which is capable of being wound from one end thereof, such that, when a cassette lid is closed from its open state by the hand, for example, the coil spring is wound from one end thereof by the fore of the pressure and consequently caused to generate gradual braking force and prevent the cassette lid from being violenntly closed with a bang and, just before becoming completely wound, stopped in place by an engaging member and prevented from unwinding itself to keep the cassette lid in a closed position and, when the cassette lid is subsequently opened from its closed state, the coil spring is released from the engaging member and enabled to unwind itself in a braked condition and gently open the cassette lid.

Use of this rotary damper means in an opening-closing device offers an advantage that the opening and closing motions of the device can be braked by simply combining a spring serving to draw the opening-closing device constantly toward its opened position, a locking mechanism serving to lock the device in its closed position, means incorporated in the damper means and adapted to release the locking mechanism, the damper means interposed between the opening-closing device and the main body using this device, and a toothed wheel or sector gear possessing teeth fitting the teeth of the toothed wheel in the damper device. In spite of this advantage, the combination still uses numerous component parts, requires much time and labor for assembly, and therefore is high in cost.

In the circumstances, there is growing demand for damper means which permits a locking mechanism and means for its release to be disposed between an opening-closing device and a main body using this device, incorporates a coil spring in itself to brake both opening and closing motions of the opening-closing device and, at the same time, relies solely on the force of the coil spring to open the opening-closing device.

SUMMARY OF THE INVENTION

This invention has originated from an appreciation of the state of prior art described above. It has as its object the provision of a rotary damper means which provides effective braking of both opening and closing motions of an opening-closing device such as a lid or a door, enables the opening-closing device to be opened with the unwinding resilient force of a coil spring, permits the winding force of the coil spring to be freely selected and the braking property thereof consequently to be adjusted to the particular use for which the damper means is intended, comprises a small number of component parts, reduces the time and labor required for assembly, and decreases product cost.

To fulfill the object described above, the rotary damper means of this invention comprises a base plate for attachment, a rotary cylinder disposed rotatably on the base plate through the medium of a damper, and a coil spring fastened at one end thereof to the base plate and at the other end thereof to the rotary cylinder. The base plate for attachment is fixed to the device on which the damper means is used and a toothed wheel formed on the outer surface of the rotary cylinder is meshed with the corresponding portion of an opening-closing device such as a lid or a door. When the opening-closing device is closed from its open state, it is pushed in toward the closed position against the resilient force of the coil spring while the damper generates a braking force. When the opening-closing device is released from its closed state by a lock, the resilient force of the coil spring gently opens the device while under the influence of the braking force of the damper. The resilient force of the coil spring can be suitably adjusted by changing the position of the connection portion of the coil spring relative to the base plate or the rotary cylinder.

The other objects and characteristics of the present invention will become apparent from the further disclosure of this invention to be made in the following detailed description of preferred embodiments, with reference to the accompanying drawings.

DESCRIPTION OF THE PREFERRED EMBODIMENTS

Figure 1:
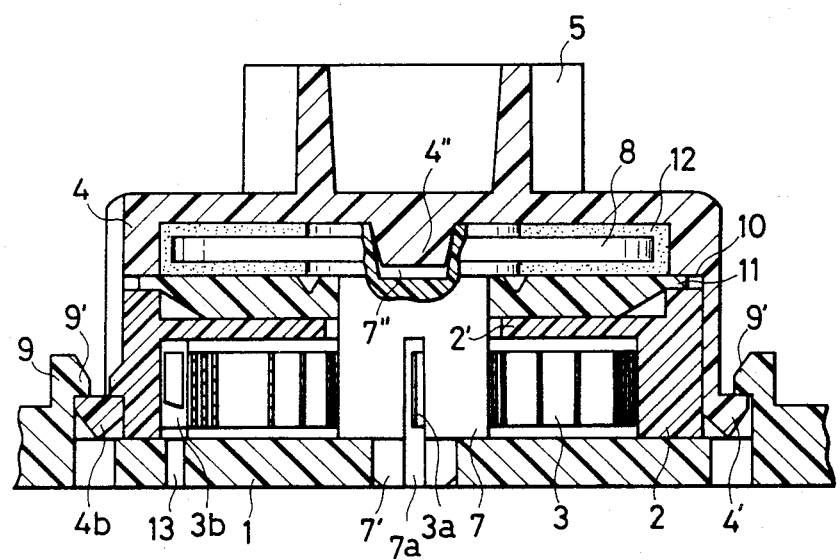
FIG. 1 is a sectional side view of one embodiment of the rotary damper means according to this invention.
Figure 2:
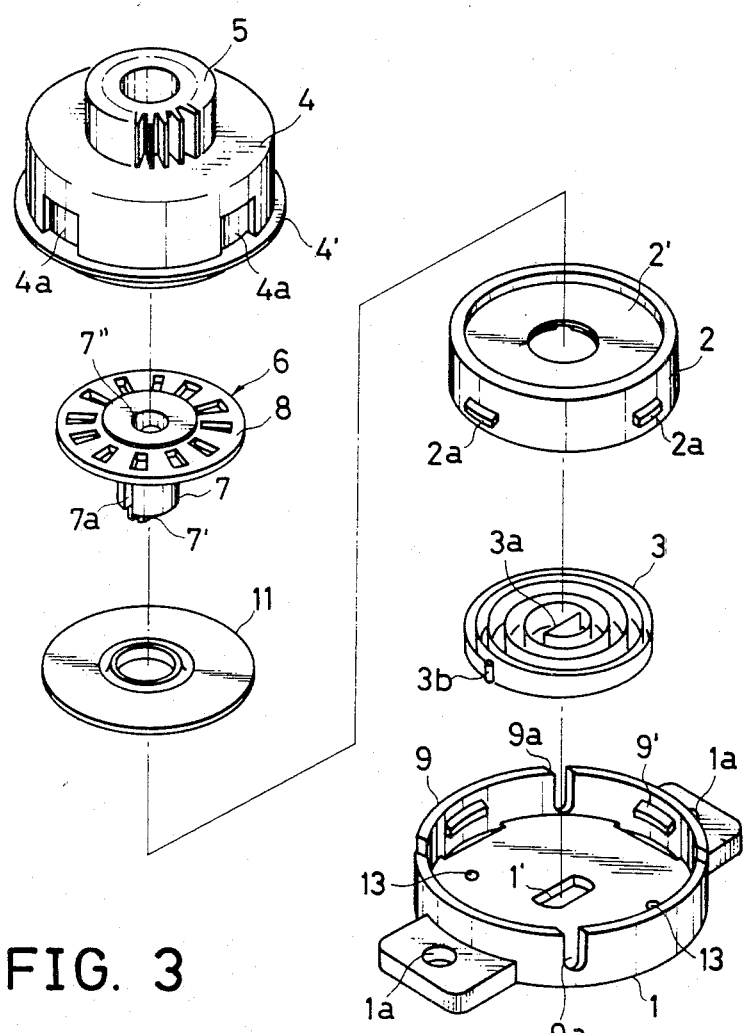
FIG. 2 is an exploded perspective view of the rotary damper means.
Figure 3:
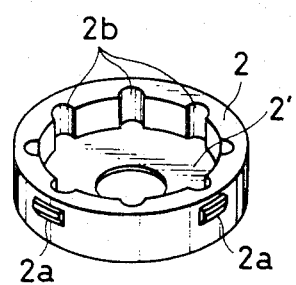
FIG. 3 is a bottom perspective view of a retainer cylinder.

FIGS. 1–3 illustrate a first embodiment of the rotary damper means of this invention.

For the convenience of description, the opening-closing device damped by the rotary damper means is presumed to be a cassette lid, though the invention is by no means limited to application to a cassette lid.

A base plate 1 for attachment possesses attachment means 1a such as claws or screw holes which are used for attaching the base plate to the device on which the damper means is used. A retainer cylinder 2 accommodates a coil spring 3 therein. A rotary cylinder 4 is rotatably attached to the base plate by snapping engagement and is provided concentrically on the upper end thereof with a toothed wheel 5. The base plate 1, the retainer cylinder, and the rotary cylinder are separately formed of plastic.

A damper 6 possesses a shaft 7 and a braking plate 8. In the present embodiment, the shaft and the braking plate are integrally formed of plastic. Optionally, they may be separately molded and subsequently combined with each other so as to be rotated together.

The rotary cylinder 4 is provided at the lower end thereof with a radially extended flange 4' and is further provided in its peripheral wall with, for example, four equally spaced window holes 4a.

From the upper surface of the base plate 1, there rises a low enclosing wall 9 and the flange 4' of the rotary cylinder fits within this wall. On the inner wall surface of the enclosing wall are formed claws 9' adapted to receive the upper surface of the flange 4' into snapping engagement therewith when the rotary cylinder is forced into the base plate 1. In the enclosing wall, notches 9a may be formed when necessary to facilitate insertion of the rotary cylinder into snapping engagement therewith.

On the inner wall surface of the rotary cylinder 4 is formed a step 10 at a position slightly higher than the height of the retainer cylinder 2 from the lower end thereof. The inside diameter of the rotary cylinder below this step is large enough to accommodate the retainer cylinder 2. Above the step 10, the inside diameter of the rotary cylinder 4 is smaller than that below the step and is larger than the diameter of the braking plate 8 of the damper.

The retainer cylinder 2 is provided on the outer wall surface thereof with protuberances 2a corresponding to the window holes 4a formed in the lateral wall of the rotary cylinder and is provided on the inner wall surface thereof with a plurality of circumferentially spaced grooves 2b adapted to grasp a raised cylinder 3b formed by coiling up the outer end of a coil spring 3. To retain the inner end 3a of this coil spring, the damper 6 is provided at the lower end of the shaft 7 thereof with a slit 7a cut upwardly from the lower end. At the lower end of the shaft 7 is formed a non-circular part 7' adapted to be received into unrotatable engagement in a non-circular hole 1' formed in the base plate 1 at the center of the space enclosed by the enclosing wall 9. At the upper end of the shaft is formed a circular depression 7" adapted to admit a circular projection 4" raised downwardly from the center of the upper wall of the rotary cylinder 4.

Preparatory to assembly, the opposite surfaces of the braking plate 8 of the damper and, optionally, the inner wall surface of the rotary cylinder 4 above the step 10 are coated with highly viscous oil 12 such as silicone grease and the damper 6 is inserted into the rotary cylinder 4, and the depression 7" on the upper end of the shaft 7 is fitted around the aforementioned projection 4". Then, a sealing disk 11 of a rubber substance provided at the center thereof with a hole for passing the shaft 7 and having an outside diameter roughly equal to the outside diameter of the retaining cylinder 2 is fitted around the shaft of the damper. The periphery of the sealing disk 11 is allowed to rest on the step 10. (Of course, the sealing disk may be fitted around the shaft before the damper is inserted into the rotary cylinder.)

Then, the retainer cylinder 2 is upwardly driven into the rotary cylinder 4 and the protuberances 2a on the outer wall surface of the retainer cylinder are brought into snapping engagement with the lower edges of the window holes 4a in the peripheral wall of the rotary cylinder. Consequently, the retainer cylinder is allowed to rotate in conjunction with the rotary cylinder and, at the same time, compresses the periphery of the sealing disk 11 against the step 10. Optionally, the peripheral portion of the sealing disk 11 may be fixed to the step 10 by swaging (welding).

In the present embodiment, the retainer cylinder 2 is provided slightly below the upper end thereof with an upper wall 2' containing a hole for passing the shaft 7 of the damper. Thus, the retainer cylinder 2 is capable of holding in place on this upper wall the lower downwardly swelled surface of the sealing disk 11. This upper wall may be omitted when desired.

Then the coil spring 3 is accommodated inside the retainer cylinder 2 and the inner end 3a of the coil spring is inserted into the slit 7a at the lower end of the damper shaft 7 and the raised cylinder 3b at the outer end is set into one of the grooves 2b in the inner wall surface of the retainer cylinder. Consequently, the coil spring is properly wound when the cassette lid is closed from its opened state. In this manner, the coil spring accumulates resilient force which is manifested when the cassette lid is opened the next time.

After the coil spring has been set in place as described above, the rotary cylinder 4 together with the retainer cylinder 2 is driven into the enclosing wall 9 of the base plate while the non-circular part 7' at the lower end of the damper shaft 7 protruding from the lower surfaces of the retainer cylinder and the rotary cylinder is fitted into the non-circular hole 1' in the base plate. The upper surface of the flange 4' of the rotary cylinder is received into snapping engagement with the claws 9' formed on the inner wall surface of the enclosing wall.

Consequently, the circular projection 4" formed downwardly from the center of the upper wall of the rotary cylinder enters the circular depression 7" in the upper end of the shaft 7 of the damper 6 and, at the same time, the non-circular portion 7' at the lower end of the shaft enters the non-circular hole 1' formed at the center of the space encircled by the enclosing wall of the base plate 1 to be unrotatably set in place at the center. Consequently, the rotary cylinder becomes rotatable in conjunction with the retainer cylinder on the base plate. For reduction of the friction between the rotary cylinder and the base plate, a downwardly pointed portion 4b may be formed, for example, at the lower end of the rotary cylinder to decrease the area of mutual contact.

Now, the base plate 1 is fixed to either the cassette lid or the body of the device and a toothed wheel or sector gear adapted to be meshed with the toothed wheel 5 when the cassette lid is being opened or closed is disposed on the other member of the aforementioned pair. Once this arrangement is completed, the rotary cylinder and the retainer cylinder in conjunction with the toothed wheel 5 are rotated in the direction of winding the coil spring 3 from outside as the cassette lid is closed from its opened state. Further, the rotation of the rotary wheel is braked by the viscous resistance of the oil 12 because the lower surface of the upper wall of the rotary cylinder and the sealing disk 11 are opposed to the stationary braking plate 8 of the damper each across the oil 12 capable of providing high viscous resistance. Consequently, since the closure of the cassette lid is continued against the gradually increasing resilient force of the coil spring and the viscous resistance of the oil, the cassette lid is prevented from being abruptly or violently closed.

When the cassette lid is completely closed, a proper locking mechanism, not shown, disposed between the cassette lid and the main body of the device is actuated to keep the cassette lid in the closed state.

To open the cassette lid, a push button, not shown, is depressed to release the locking mechanism. Consequently, the wound-up coil spring 3 begins to unwind and, by its resilient force, rotates the rotary cylinder together with the retainer cylinder in the reverse direction of opening the cassette lid. The cassette lid is gently opened because the rotation of the rotary cylinder 4 is braked by the viscous resistance of the oil 12 as described above.

When, as in the present embodiment, the retainer cylinder is provided in the peripheral wall thereof with a plurality of circumferentially spaced grooves 2b adapted to admit the raised cylinder 3b at the outer end of the coil spring, the intensity of the resilient force which the coil spring accumulates in opening the cassette lid or the intensity of the resilient force the coil spring offers to the force with which the cassette lid is closed may be suitably fixed by selecting the particular groove for admission of the raised cylinder 3b during the assembly. When holes 13 are formed in the base plate 1 at least one each at the positions coinciding with the grooves 2b in the inner wall surface of the retainer cylinder, the intensity of the resilient force of the coil spring may be increased or decreased from the intensity fixed at the time of assembly by inserting a fine pin, for example, through the particular hole communicating with the raised cylinder 3b formed by coiling the outer end of the coil spring, inserting the pin into this raised cylinder 3b, then externally rotating the rotary cylinder in one direction or the other to release the raised cylinder 3b from the groove which has been held by up to this time, causing the raised strip to enter the next groove or the one after next.

In the present embodiment, the coil spring is accommodated in the retainer cylinder 2 which rotates together with the rotary cylinder. Primarily, however, the retainer cylinder is intended to fasten the peripheral portion of the sealing disk 11 against the step 10 on the inner wall surface of the rotary cylinder to prevent leakage of the oil 12. When the peripheral portion of the sealing disk is fixed as by welding to the inner wall surface of the rotary cylinder, therefore, the retainer cylinder may be omitted. In this case, the grooves 2b for admitting the raised cylinder 3b at the outer edge of the coil spring may be formed in the lower part of the inner wall surface of the rotary cylinder 4. The inner end 3a of the coil spring is set in place in the slit 7a in the lower part of the shaft 7 of the damper which is unrotatably fixed to the base plate 1. Alternatively, it may be directly fixed to the base plate 1 instead of to the shaft of the damper.

Figure 4:
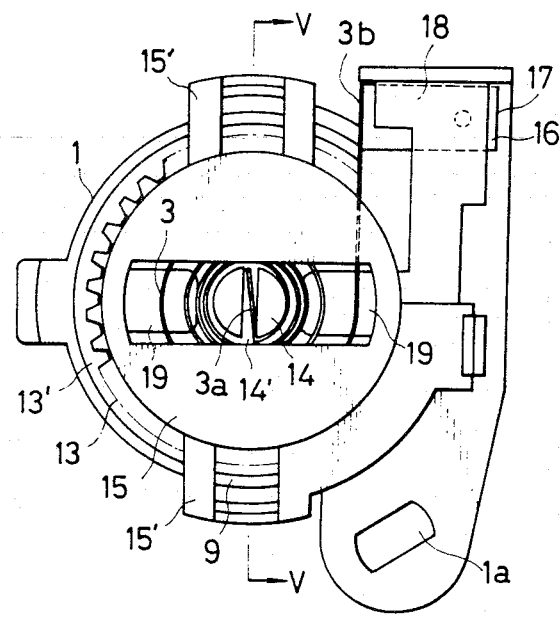
FIG. 4 is a plan view of another embodiment of the rotary damper means according to this invention.
Figure 5:
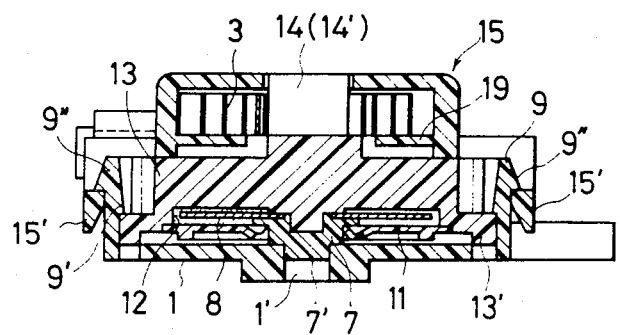
FIG. 5 is a sectional side view of the rotary damper means of FIG. 4.
Figure 6:
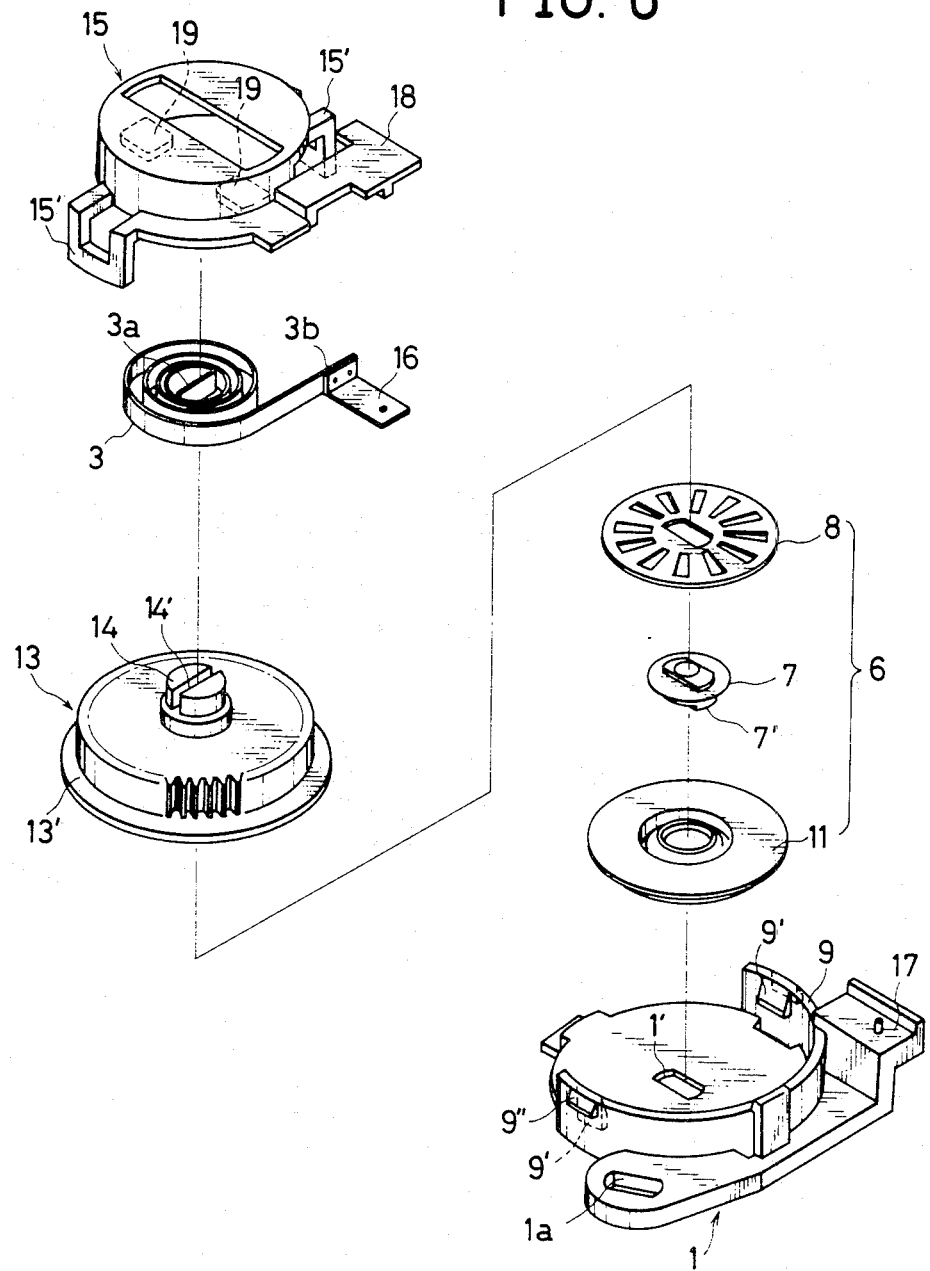
FIG. 6 is an exploded perspective view of the rotary damper means of FIG. 4.

FIGS. 4–6 illustrate another embodiment of this invention. In this embodiment, the enclosing wall 9 of the base plate 1 is formed as part of a circle slightly larger than a semi-circle. A rotary cylinder 13 incorporating a toothed wheel is provided at the lower end thereof with a flange 13' protruding radially from the outer surface.

When the rotary cylinder 13 is fitted within the inner wall surface of the enclosing wall 9, the flange 13' of the rotary cylinder has its upper surface received into snapping engagement with claws 9' raised from the inner wall surface of the enclosing wall. Consequently, the rotary cylinder is rotatably retained therein.

To accommodate the damper 6, the rotary cylinder 13 is provided on the lower surface thereof with an open depression. The shaft 7 of the damper is provided in the upper end thereof with a circular depression. A circular projection formed at the center of the depression in the lower surface of the rotary cylinder enters the circular depression in the upper end of the shaft 7. Around the damper shaft is fitted the sealing disk 11. The peripheral part of the disk is fixed as by welding to the aforementioned depression in the rotary cylinder halfway of the depth thereof to prevent leakage of oil 12 in which the braking plate 8 is immersed. The non-circular projection 7' at the lower end of the damper shaft enters the non-circular hole 1' formed at the center of the base plate 1. With this arrangement, the damper does not rotate even when the rotary cylinder is rotated and, consequently, brakes the motion of the rotary cylinder in both directions.

A short shaft 14 rises from the center of the upper surface of the rotary cylinder and a slit 14' is formed in this shaft downwardly from the upper end thereof. This slit 14' serves to retain in place the inner end 3a of the coil spring 3.

On the upper surface of the rotary cylinder, a cap 15 having a diameter equal to or slightly smaller than the diameter of the main body of the rotary cylinder is mounted. This cap 15 is provided with several legs 15' first drawn outwardly and then extended downwardly. The lower ends of the legs are brought into snapping engagement with the claws 9" formed on the outer wall surface of the enclosing wall of the base plate 1. By this engagement, the cap 15 is joined to the base plate.

The outer end 3b of the coil spring, which has a fitting piece 16 laterally fastened thereto, is drawn outwardly through the hole in the lateral portion of the cap 15. When the cap 15 is pressed down against the base plate 1 and received into snapping engagement, colliding plates 17, 18 provided respectively for the cap and the base plate and adapted to approach each other in the vertical direction come to nip the fitting piece 16. It is desirable for the fitting piece 16 to be provided with a hole and one of the colliding plates to be provided with a protuberance adapted to enter the hole, as illustrated.

For the coil spring to be supported on the upper surface of the rotary cylinder as slightly separated therefrom, the cap is provided on the inner wall surface thereof with opposed receiving plates 19. The coil spring 3 is accommodated on these receiving plates 19.

In this embodiment, the inner end of the coil spring 3 is fixed to the rotary cylinder and the outer end thereof is fixed in place by the base plate 1 and the cap bound thereto. In this arrangement, the motion of the cassette lid in one direction sets the rotary cylinder rotating in one direction and winds the coil spring from the inner end and allows it to accumulate resilient force. When the cassette lid is opened from its closed state, the locking mechanism is released as by the use of a push button. Consequently, the lid is opened by the resilient force of the coil spring. Since the damper is capable of braking both the opening and closing motions of the lid, the cassette lid is prevented from being violently closed. When the cassette is opened, it is caused to open gently.

Figure 7:
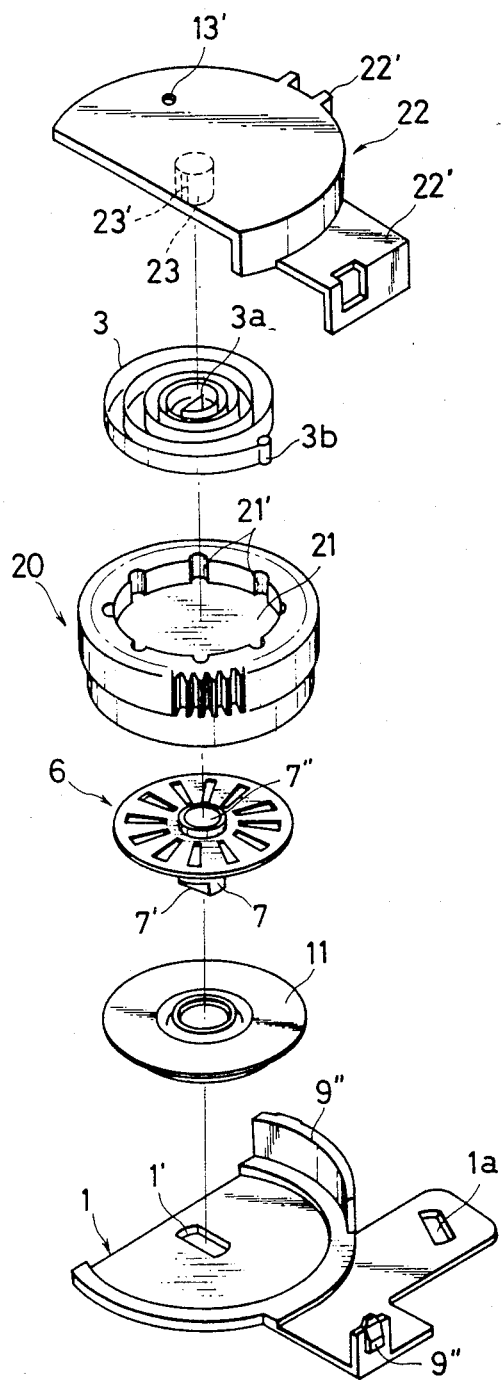
FIG. 7 is an exploded perspective view of still another embodiment of the rotary damper means according to the present invention.

FIG. 7 illustrates yet another embodiment of this invention wherein, similarly to that of the embodiment of FIGS. 4–6, the rotary cylinder 20 is provided on the lower surface thereof with an open depression adapted to accommodate the braking wheel of the damper 6. Around the shaft 7 of the damper is fitted the sealing disk 11. Then the peripheral portion of the sealing disk is welded to the inner wall surface of the depression to prevent leakage of the oil in which the braking plate is immersed. The lower end of the damper shaft is fitted unrotatably in the non-circular hole 1' at the center of the base plate 1. The circular projection, not shown, formed at the center of the lower surface of the depression of rotary cylinder 20 enters the circular depression 7" in the upper end of the damper shaft. With this arrangement, the damper is not rotated even when the rotary cylinder rotates in either direction on the base plate. Thus, the damper serves to brake the rotation of the rotary cylinder.

The rotary cylinder is provided on the upper surface thereof with an open depression 21 similarly to the retainer cylinder 2 in the embodiment of FIGS. 1–3. Along the inner wall surface of the depression 21 are disposed a plurality of circumferentially spaced grooves 21' adapted to admit the raised cylinder 3b formed by coiling the outer end of the coil spring.

An upper lid 22 is mounted on the rotary cylinder 20. It is bound to the base plate while keeping the rotary cylinder 20 lightly nipped between itself and the base plate 1. By 22' are denoted legs which are brought into snapping engagement with the claws 9" of the base plate for the purpose of uniting the upper lid and the base plate mentioned above. On the lower surface of the upper lid 22 at a position coinciding with the center of the rotary cylinder, a shaft 23 is formed which projects downwardly and enters the depression 21' of the rotary cylinder. In this shaft 23, a slit 23' is cut upwardly from the lower end thereof. This slit 23' serves to support in place the inner end 3a of the coil spring 3.

In the present embodiment, therefore, the rotation of the rotary cylinder winds the coil spring from the outer end thereof and allows the coil spring to accumulate resilient force similarly to the embodiment of FIGS. 1–3.

Optionally, the upper lid 22 is provided with hole 13 adapted to communicate with the grooves 21'. During the assembly, these holes 13 permit selection of the particular groove 21' from among the group of grooves for admission of the raised cylinder 3b at the outer edge of the coil spring and consequent adjustment of the intensity of the resilient force of the coil spring. After the assembly, a desired change in the intensity of the resilient force of the coil spring can be obtained by inserting a fine pin through the hole 13 and shifting the raised cylinder 3b from the former groove 21' to another newly selected groove 21'.

As is evident from the foregoing description, this invention provides damper means which brakes both the opening and closing motions of a given opening-closing device and enables the opening-closing device to open with the unwinding resilient force of a coil spring.

What is claimed is:

1. A co-axial rotary damper device, comprising:
    a plastic base plate adapted to be fixed to either a main body of a device to be served by said damper device or an opening-closing device used with said device,
    a hollow plastic rotary cylinder rotatably disposed on said base plate and rotatable in either a clockwise or a counter-clockwise direction, separate damper plate means non-rotatably fixed relative to said base plate and positioned completely within said rotary cylinder thereby making said rotary cylinder subject to a braking force generated by said damper plate means and a viscous fluid when said rotary cylinder is rotated by a first suitable means activated by an opening or closing motion of said opening-closing device,
    a coil spring fastened at one end thereof by a second suitable means to said base plate and connected by a third suitable means at the other end thereof to said rotary cylinder, said spring adapted to be wound and accumulate resilient force by the rotation of said rotary cylinder in one direction,
    and a plurality of snap catch fastening means and cooperating shoulder means on said base plate and said rotary cylinder, respectively, to thereby insure rapid coaxial assembly of said rotary damper device.

2. A rotary damper means according to claim 1, wherein said third suitable means comprises a plastic retainer cylinder for encasing said coil spring which is disposed between said damper plate means and said base plate and provided on an inner wall surface thereof with a plurality of grooves adapted to releasably receive the other end of said coil spring, said retainer cylinder and said rotary cylinder each having means for snap engagement cooperation to insure that they rotate together.

3. A rotary damper means according to claim 1, wherein said second suitable means comprises a plastic cap, said coil spring being mounted on an end of said rotary cylinder which is disposed on and axially fixed relative to the base plate, said spring being accommodated within the cap, said cap being snap fastened to said base plate.

4. A rotary damper means according to claim 1, wherein a first depression for accommodating said damper is formed on one end of said rotary cylinder, a second depression for accommodating said coil spring is formed on the other end thereof, a plurality of grooves adapted for engagement with one end of said coil spring are formed on the inner peripheral wall surface of said second depression encasing said coil spring, and means for retaining said spring in said second depression, said retaining means also securing one end of said spring relative to said base plate as well as axially retaining said rotary cylinder relative to said base plate.

* * * * *